United States Patent [19]
Freidrich et al.

[11] Patent Number: 5,460,416
[45] Date of Patent: Oct. 24, 1995

[54] PERFORATED FIBER REINFORCED PIPE AND COUPLINGS FOR ARTICULATING MOVEMENT

[75] Inventors: Ralph S. Freidrich, Hermosa Beach, Calif.; Ronald G. Ulrich, Spartanburg, S.C.; Ronald D. Johnson, Bellflower; Robert E. Hamilton, Big River, both of Calif.

[73] Assignee: Ameron, Inc., Pasadena, Calif.

[21] Appl. No.: 100,676

[22] Filed: Aug. 2, 1993

[51] Int. Cl.$^6$ .............................. F16L 27/04; F16L 9/16
[52] U.S. Cl. .................... 285/166; 285/233; 285/264; 138/123; 166/231; 210/497.1
[58] Field of Search .................................. 285/166, 233, 285/264; 138/130, 123; 156/425, 175; 166/231, 242, 232, 233; 210/323.2, 304, 497.1, 483, 484, 485; 405/128

[56] References Cited

U.S. PATENT DOCUMENTS

| | | |
|---|---|---|
| 855,652 | 6/1907 | Mori . |
| 2,009,163 | 7/1935 | Chesley ........................................ 61/10 |
| 2,160,790 | 5/1939 | Swanson ................... 166/231 |
| 2,944,840 | 7/1960 | Wiltse ....................... 285/232 |
| 3,440,822 | 4/1969 | Hegler ............................... 61/10 |
| 3,516,448 | 6/1970 | Baker ..................... 138/144 |
| 3,596,934 | 8/1971 | Cenzo ..................... 285/233 |
| 3,606,402 | 9/1971 | Medney ..................... 285/305 |
| 3,695,644 | 10/1972 | Goldberg ............... 285/166 |
| 3,712,373 | 1/1973 | Bearden et al. ........................ 166/233 |
| 3,759,553 | 9/1973 | Carter ..................... 285/305 |
| 4,019,539 | 4/1977 | Hoffmann et al. ........................ 138/130 |
| 4,133,379 | 1/1979 | Nuzman et al. ..................... 210/497.1 |
| 4,415,613 | 11/1983 | Medney ..................... 428/36 |
| 4,421,646 | 12/1983 | Correge et al. ........................ 210/484 |
| 4,483,396 | 11/1984 | Kennelly ................... 166/242 |
| 4,815,892 | 3/1989 | Martin ........................ 405/45 |
| 4,842,059 | 6/1989 | Tomek ........................ 285/264 |
| 5,078,727 | 12/1991 | Johnson et al. ........................ 405/128 |
| 5,128,028 | 7/1992 | Lamort ................... 210/497.1 |

FOREIGN PATENT DOCUMENTS 54828  6/1982  European Pat. Off. ............ 210/497.1

Primary Examiner—Eric K. Nicholson
Attorney, Agent, or Firm—Christie, Parker & Hale

[57] ABSTRACT

A pipe for extracting gases from a landfill well comprises a series longitudinal windings of fiber reinforced resin windings wound for providing longitudinal strength. The longitudinal windings are wound in directions opposite to and intersecting with each other, forming a interlocking network of windings and openings. A number of reinforcing ribs extend circumferentially around the surface of the right and left hand windings at equidistant positions along the surface and at each end of the pipe for providing radial stiffness. The reinforcing rib at each end of the pipe comprises a groove extending circumferentially around the outside surface of the rib for facilitating interconnection with adjacent pipes. A helical winding is wound around the surface of longitudinal windings between adjacent reinforcing ribs for providing longitudinal strength and radial stiffness to the pipe. The pipe comprises a plurality of perforations in its surface. Adjacent pipes are joined together by an articulating coupling comprising a hollow cylindrical sleeve having an circular opening at each end and a groove extending circumferentially around the inside surface of each opening. A key is used for retaining each pipe within the coupling by inserting the pipe end into the coupling, aligning the groove in the pipe end with the groove in the respective coupling opening, and inserting the key to partially fill the space defined by the two grooves.

29 Claims, 4 Drawing Sheets

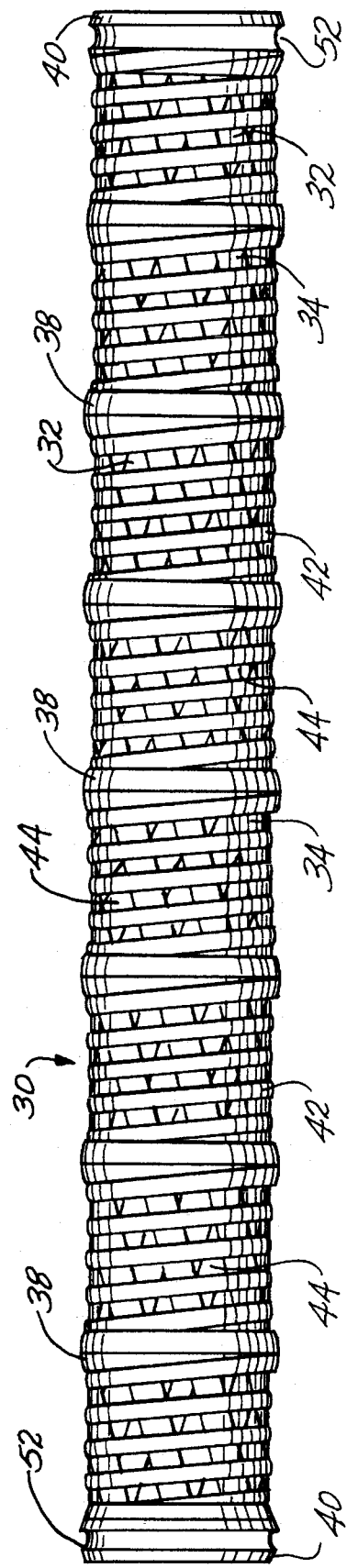

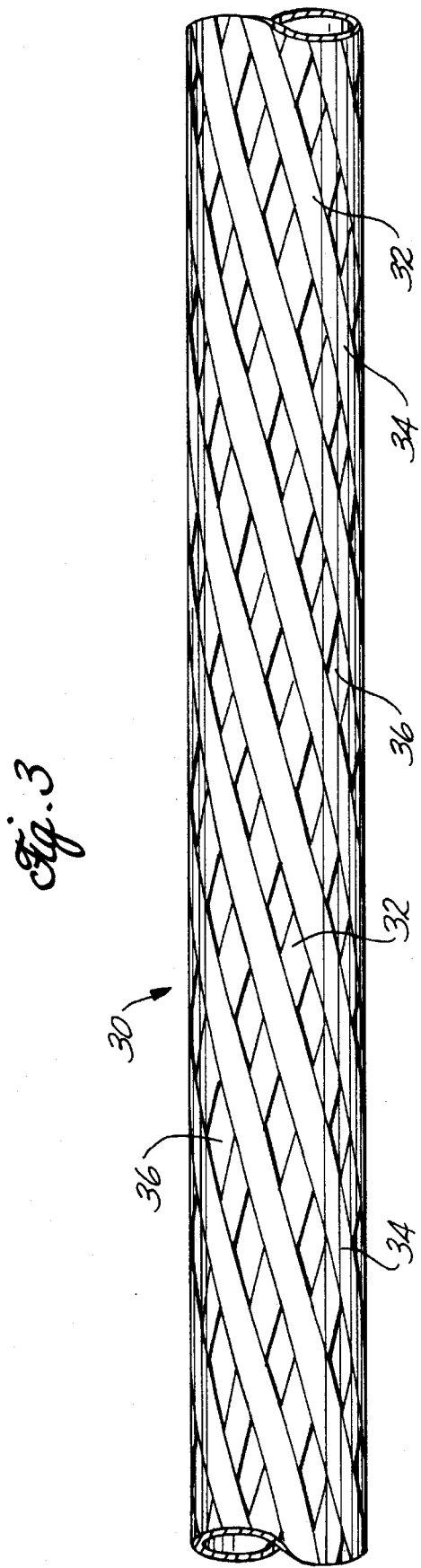

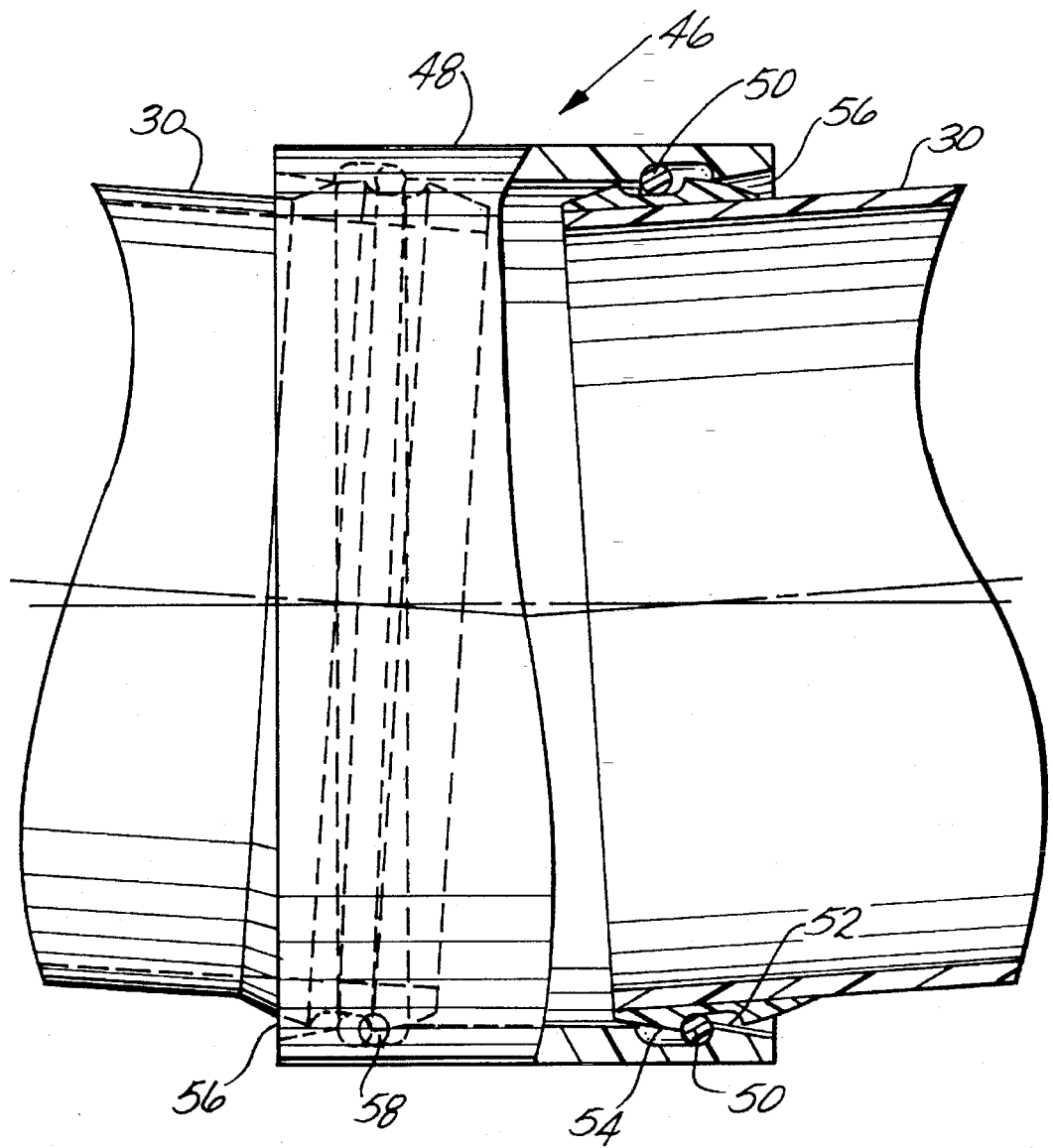

PERFORATED FIBER REINFORCED PIPE AND COUPLINGS FOR ARTICULATING MOVEMENT

FIELD OF THE INVENTION

This invention relates to a perforated fiber reinforced pipe, specifically, a perforated fiber resin pipe for extracting gases from refuse landfill wells and the like that is capable of resisting crushing forces and accommodating lateral forces in the well bore due to shifting waste material.

BACKGROUND

Waste material that is disposed of in landfills is typically collected in one location until a sufficient amount has been accumulated and covered with fill material. Once a sufficient amount of waste material has been accumulated, the waste material is distributed and covered with soil. Heavy machinery such as bulldozers and the like are used to distribute the soil over the waste material, or to construct a pit to accommodate the waste material. Whichever method is used the result is the same, the waste material is buried with soil and compacted. After the waste material is buried, the process of collecting, burying, and compacting the waste material repeats itself. As a result, it is not uncommon for a landfill to comprise several hundred feet of buried waste material.

Waste materials buried in the landfill that are biodegradable will eventually undergo a decomposition reaction, producing gases which are high in methane and quite flammable. As the waste material continues to decompose, the production rate of the gases increases, increasing the pressure of the gases. Unless the gases are collected below the landfill surface, the rising pressure of the gases may cause the gases to find their way to the surface. If allowed to permeate the landfill surface, the gases will create both an air pollution problem and a explosion hazard that may be ignited by any nearby source, such as a garbage truck, bulldozer or the like. After the gases have been allowed to travel to the landfill surface they are extremely difficult to contain due to their inherent ability to migrate horizontally through the soil to a different surface location.

In order to protect against such dangers, wells can be constructed in the landfill to collect the gases below the landfill surface before they are allowed to migrate to the landfill surface. These wells are constructed by first boring a hole into the surface of the landfill and down through the various layers of fill and waste material to a level where gas generation is detected. Sections of pipe are lowered down into the hole and connected together to form a continuous pipe string which extends from the surface throughout the depth of the hole. The types of pipe used in such wells typically have a perforated surface area near the lower end to permit the passage of the gases from the surrounding fill material into the pipe and upward to the landfill surface for collection. The gases are extracted from the waste material surrounding the perforated pipe surface of the pipe string. The upper portion of the pipe has a solid wall. The pipe string is subjected to a vacuum at the surface to facilitate the efficient extraction of the gases.

Perforated pipes that are used to extract gases from landfill wells are known in the art. These pipes may be constructed from existing non-perforated pipe by simply forming holes in the surface of the pipe. These pipes may, therefore be made from well known pipe materials such as carbon steel and the like. However, the down-hole conditions in landfill wells are extremely corrosive making the use of carbon steel pipes impractical.

Perforated pipes are known to be constructed from polyethylene. The use of polyethylene as a pipe material eliminates the problem of corrosion. However, the decomposition reaction of waste material is exothermic, oftentimes generating down-hole temperatures in the range of from 150° to 180° F. There are forces tending to crush the pipe. Additionally, the pipe sections in a pipe string are oftentimes subjected to down-hole lateral forces caused by shifting waste material. Therefore, in order to ensure that a pipe made from polyethylene will have a sufficient degree of radial stiffness to resist deformation and collapse when subjected to such temperatures and lateral forces, a polyethylene pipe must be manufactured having a continuous wall thickness of significant dimension. For example, a polyethylene pipe having a twelve inch diameter for use in a landfill well is constructed having at least a two inch wall thickness in order to survive the down-hole temperatures, crushing loads and lateral forces.

The need to construct a polyethylene pipe having such a significant wall thickness functions to increase both the diameter of the bore hole that must be created to accommodate the pipe, and the weight of each pipe section used to construct the pipe string. Increasing each of these factors effectively increases the time, cost, and effort required to both manufacture the pipe and construct a well using such pipe. These factors are of considerable importance considering the fact that a single landfill may construct and operate as many as 50 wells up to 200 feet deep, or more in larger landfills.

Additionally, it is well known that the depth of compacted waste material and soil in a landfill is unstable and oftentimes undergoes a significant settling as the waste material decomposes and is converted to gas. Such settling is not uniform across the landfill and lateral shifting often occurs. Pipe strings in landfill wells are often subjected to lateral shear forces imposed by surrounding layers of waste materials that have shifted. Pipes manufactured from carbon steel have been known to break when subjected to these shear stresses. Pipes manufactured from polyethylene have been known to collapse when subjected to similar shear forces. A pipe string comprising a broken or collapsed pipe section effectively renders the respective landfill well useless because the vacuum that is pulled on the pipe string no longer results in the extraction of the gases from the waste material surrounding the entire pipe string, but rather only effects a localized extraction of gases from the discrete section of waste material residing above the broken or collapsed portion.

It is, therefore, desirable to construct a perforated pipe that is capable of withstanding the down-hole corrosive conditions in a landfill well without loss of mechanical integrity. It is also desirable to construct a perforated pipe that is capable of withstanding the down-hole temperature and shear conditions in a landfill well without requiring a significant wall thickness that will facilitate the economic and efficient construction of both the pipe and landfill wells incorporating such pipes.

It is further desirable to construct a perforated pipe that is capable of being joined together with other pipes in a manner that will accommodate the lateral forces exerted upon the pipe string, so as to minimize the effects of such forces upon each individual pipe section. It is also desirable that the pipe be constructed in an economic manner using practical manufacturing methods.

BRIEF SUMMARY OF THE INVENTION

There is, therefore, provided in practice of this invention according to a presently preferred embodiment, a perforated pipe for extracting gases from a landfill well. The pipe comprises a series of right hand and a left hand longitudinal windings for providing longitudinal strength. The right hand windings may be wound in a helical pattern having a longitudinal angle of wrap in the range of from about 5 to 55 degrees from the axis of the pipe. The left hand windings may be wound in a helical pattern having a longitudinal angle of wrap in the range of from about 5 to 55 degrees, from the axis of the pipe, in a direction opposite to and intersecting with the right hand windings. The longitudinal windings may be made from a fiber reinforced resin material. The right and left hand windings may form an interlocking network of longitudinal windings and openings comprising in the range of from 0 to 50 percent openings.

A number of reinforcing ribs extend circumferentially around the surface of the longitudinal windings. The reinforcing ribs may comprise a fiber reinforced resin material. The reinforcing ribs may be positioned at equidistant locations along the length of the pipe and at each end of the pipe. The reinforcing ribs provide radial stiffness along the length of the pipe to accommodate down-hole crushing forces and provide reinforcement at each pipe end for accommodating interconnection between the pipes. The reinforcing ribs may cover approximately 25 percent of the surface of the right and left hand windings and have a thickness of at least two times the average wall thickness of the series of longitudinal windings. Thus, the wall thickness at the ribs is about three times the average thickness of the lateral windings. Generally speaking, it is desirable to have higher ribs for greater crush resistance of the pipe.

A helical winding may be wound around the surface of the longitudinal windings between each reinforcing rib. The helical winding may comprise a fiber reinforced resin material that may be wound having a helical angle of wrap in the range of from about 55 to 85 degrees from the axis of the pipe. The helical winding enhances longitudinal strength and provides radial stiffness to the portion of the pipe between each reinforcing rib. The helical winding may be applied so that it covers approximately two-thirds of the surface of the longitudinal windings between each reinforcing rib.

The pipe comprises a plurality of perforations along the surface of the longitudinal windings between adjacent reinforcing ribs as defined by the helical windings. The perforations should preferably have an opening sized smaller than the size of gravel rock that is used to surround the pipe in the well.

The end of each pipe may comprise a groove extending circumferentially around outside surface of the reinforcing rib at that location. Each pipe may be joined together by an articulating coupling which permits the articulating movement of each pipe within the coupling. The coupling comprises a hollow cylindrical sleeve having a circular opening at each end. The inside surface of each opening accommodates a predetermined degree of articulating movement by each pipe. The coupling has a groove extending circumferentially around the inside surface of each opening. The coupling may be used to join together two pipes by placing the ends of adjacent pipes into opposite ends of the coupling, aligning the grooved portion of each pipe end with the respective grooved portion of each coupling, and inserting a key into the space created by the aligned grooves to partially occupy the space and retain each pipe in the coupling.

BRIEF DESCRIPTION OF THE DRAWINGS

These and other features and advantages of the present invention will become appreciated as the same becomes better understood with reference to the specification, claims and drawings wherein:

FIG. 2 is a side view of a specific embodiment of a perforated pipe constructed according to principles of the invention;

FIG. 3 is a side view of a section of the in-process perforated pipe illustrating the interlocking network of a series of right and left hand longitudinal windings; and FIG. 4 is a longitudinal cross sectional view of a coupling constructed according to principles of invention for connecting the perforated pipe together.

DETAILED DESCRIPTION

Figure 1:
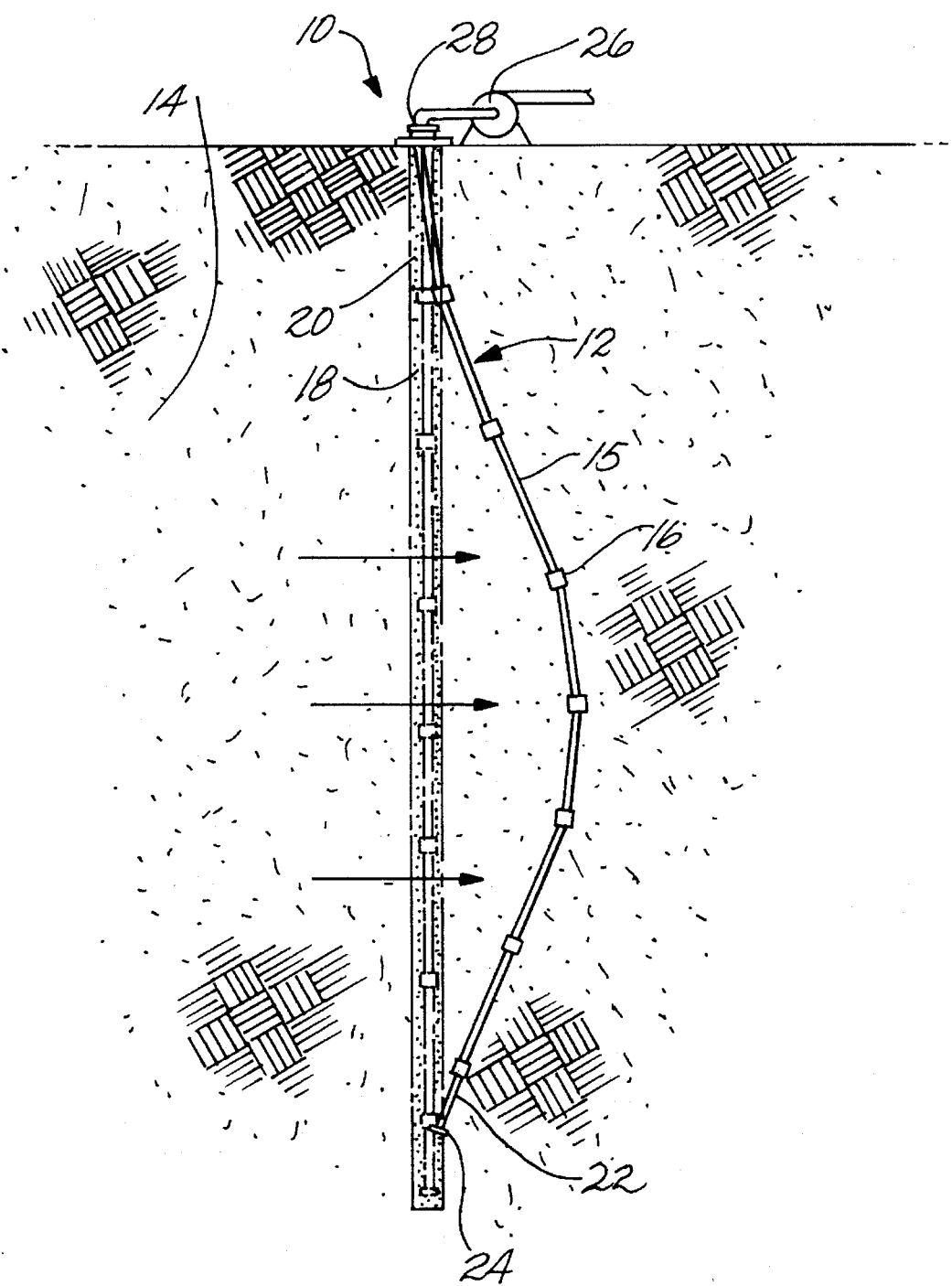
FIG. 1 is a cross sectional view of a landfill well comprising a number of perforated pipes constructed and joined together according to principles of invention.

A pipe provided in the practice of this invention may be used in landfill wells for the purpose of extracting gases that are generated from the decomposing waste material buried beneath the landfill surface. The pipe may be made from a non-metallic material that does not corrode when subjected to down-hole conditions. The pipe may be constructed in a manner that produces a pipe having a relatively thin wall thickness, when compared to pipes made from polyethylene, that will not deform or collapse when exposed to down-hole temperatures and crushing forces. Related to the reduced wall thickness is the cost savings associated with the material savings and reduced effort involved in construction of a landfill well incorporating such pipe. The pipe is constructed so that it may be joined together in a manner which facilitates a sufficient degree of movement between the joined pipe sections to accommodate the down-hole lateral forces caused by shifting waste material.

FIG. 1 shows a specific embodiment of a landfill well 10 comprising a pipe string 12 extending through a depth of waste material 14. The pipe string comprises multiple sections of pipe 15 constructed according to principles of this invention that are joined together by a number of couplings 16. Typically, such landfill wells are constructed by first constructing a bore hole 18 of sufficient diameter to not only accommodate the diameter of the pipes used in the pipe string, but to accommodate the placement of a gravel bed 20 or the like which is formed about the circumference of the pipe string after the pipe string has been lowered into the bore hole. The gravel bed serves to both stabilize the pipe string within the bore hole and acts as an interface barrier between the waste material and the pipe string to prevent foreign debris from obstructing the perforated surface of the pipes.

Generally speaking, a typical landfill well may have a depth of approximately 200 feet. Accordingly, a pipe string may comprise any number of different lengths of pipe in order to make up the 200 foot length. However, for purposes of illustration and clarity, only eight pipe sections have been illustrated. The pipe string may be constructed so that only fifty feet, or one quarter of the pipe sections near the bottom of the well comprise perforated pipe for extracting the gases from the surrounding waste material. The remaining portion of the pipe string may comprise nonperforated pipe. Part of the well may be filled with clay instead of gravel to seal evolved gases in the lower section of the well.

The pipe string 12 is constructed so that the first pipe placed into the bore hole, the bottom pipe 22, comprises a nonperforated pipe having an end cap 24 placed on the end positioned at the bottom of the bore hole. A non-perforated pipe may be selected for this position in the pipe string for the purpose of collecting any liquid entering the perforated sections of the pipe string. Alternatively, a pipe section comprising a perforated portion and a non-perforated portion may be used as the bottom pipe instead of pipe section that is completely non-perforated. The water that collects in the non-perforated portion can be removed by simply inserting a hose or submersible pump into the pipe string.

The perforated pipe sections are generally positioned in the pipe string after the bottom pipe, leading one-after-another from the bottom pipe up towards the surface. Attached to the final perforated pipe is a series of non-perforated pipes that leads to the surface of the well. Only a portion of the perforated pipe is used in a pipe string in order to direct the gas extracting operation to the portion of the well where the gases may be accessed. Accordingly, the location and number of perforated pipes that are used in a pipe string is largely a function of the particular characteristics of each well.

A vacuum source 26 may be connected at the surface of the well to the open end 28 of the pipe string to facilitate the efficient extraction of gases from the pipe string. The gases that are extracted from such a landfill can either be flared or, since the gases have a BTU value slightly lower than methane, can be used as fuel or a fuel supplement in industrial applications such as boilers, furnaces, electricity producing cogeneration units and the like.

As shown in FIG. 1, over time the decomposition of the waste material 14 causes the waste material to shift and impose lateral forces upon the pipe string 12, as illustrated by the horizontal arrows. Accordingly, for purposes of illustration, FIG. 1 shows both the position of a pipe string initially aligned in the bore hole 18 soon after installation, and after a period of time during which it has been subjected to such down-hole lateral forces. The lateral forces have caused the pipe string to shift laterally away from its initial position (exaggerated in the drawing for purposes of clarity). As shown, the articulating couplings 16 permit each pipe section to respond to the local lateral forces that are exerted upon it without risking a collapse or disconnection of a pipe section by allowing each pipe section articulating movement within the coupling.

FIG. 2 illustrates a preferred embodiment of a perforated pipe constructed according to principles of this invention. The pipe 30 comprises a hollow cylinder having an inside surface, an outside surface, and a wall thickness equal to the distance between the inside and outside surfaces. However, as will be discussed in greater detail below, the wall thickness of the pipe is not constant throughout the length of the pipe. The pipe may be constructed from a fiber reinforced resin material such as epoxy impregnated fiberglass or the like.

In a preferred embodiment, the pipe may comprise two different series of longitudinal fiber-resin windings. A series of right hand longitudinal windings 32 may be created by winding onto a mandrel a plurality of fiber-resin strips. As shown in FIG. 3, the fiber-resin strips are wrapped about the surface of the mandrel in a right-hand helical pattern, each strip having a longitudinal angle of wrap in the range of from about 5 to 55 degrees from the axis of the pipe. The fiber-resin strips may be spaced apart such that the wrapping results in approximately 50 percent coverage of the pipe surface. Accordingly, the number of fiber-resin strips used in the right hand windings to achieve 50 percent coverage depends on the diameter of the pipe. For example, a pipe having a six inch inside diameter may comprise right hand longitudinal windings made up of approximately one inch wide fiber-resin strips. The number of strips wound on the mandrel will be that number which, spaced equidistantly, would provide approximately 50 percent coverage of the pipe surface.

A series of left hand longitudinal windings 34 may be created by winding onto the mandrel a plurality of fiber-resin strips. As shown in FIG. 3, the fiber-resin strips are wrapped about the surface of the mandrel in a left-hand helical pattern, having a direction opposite to and intersecting with the right hand windings, each strip having a longitudinal angle of wrap in the range of from about 5 to 55 degrees from the axis of the pipe. Like the right hand windings, the fiber-resin strips may be spaced apart such that the wrapping results in approximately 50 percent coverage of the pipe surface. Accordingly, in a preferred embodiment the combined coverage of the right and left hand windings should provide approximately 75 percent coverage of the pipe surface. After applying the right and left hand windings, the amount of surface remaining uncovered comprises approximately 25 percent and comprises a plurality of square, rectangular, or diamond-shaped openings 36.

The application of the series of right hand windings 32 and the series of left hand windings 34 produces a pipe having a surface defined by a criss-crossing helical pattern of intersecting fiber-resin strips. Depending on the particular method that is selected for applying the series of longitudinal windings, the fiber-resin strips of the right and left hand windings may either be interwoven with each other or may simply be layered over each other. In a preferred embodiment, the fiber-reinforced resin strips of the right hand windings are wound onto the mandrel and the fiber-reinforced resin strips of the left hand windings are wound on top of the right hand windings.

The operation of applying a series of right hand windings and then applying a series of left hand windings may be repeated as often as needed to achieve a desired thickness of longitudinal windings. The windings can be applied in many parallel strips so that the left and right hand windings overlap. Alternatively, by alternating single left and right hand strips, one can, in effect, obtain an interwoven basket-weave like pattern. Applying the windings in this manner produces a pipe comprising an interwoven or interlocking network of right and left hand longitudinal windings. This interlocking network of longitudinal windings increases the degree of interface between the right and left hand windings and, thus maximizes the degree of longitudinal strength provided by the longitudinal windings.

The average wall thickness of the in-process pipe, comprising the right and left hand windings, may vary depending on the extent of down-hole crushing forces that are expected to be exerted on the pipe. Generally speaking, the average thickness may comprise only one-half of the wall thickness for a typical fiber-resin pipe of the same inside diameter having a uniform wall thickness. For example, a pipe constructed according to principles of this invention having a six inch inside diameter may have a average wall thickness, comprising longitudinal windings of approximately one-eighth of an inch. In comparison, a conventional fiber-resin pipe having a six inch inside diameter has wall thickness of approximately one-quarter of an inch. According, constructing the pipe using a series of longitudinal windings permits the production of a pipe having the same longitudinal strength as an equally sized conventional fiber-resin pipe having approximately two times the wall thickness.

The right and left hand longitudinal windings may be applied by using a conventional circular delivery ring that encircles the mandrel. The winding material is typically a band or strip of parallel rovings of glass fibers passed through a bath of epoxy resin. The fiber-resin material is fed to a series of channels along the inside circumference of the delivery ring that when combined correspond to the predetermined width of the fiber-resin strip desired. The channels are directed radially inwardly toward the surface of the mandrel in order to facilitate the delivery of the fiber-resin material onto the surface of the mandrel. The mandrel is rotated as the delivery ring is moved laterally so that the fiber-resin material is delivered to the surface of the mandrel in a helical fashion.

The rotation of the mandrel and the lateral movement of the delivery ring determines the longitudinal angle of wrap for the longitudinal windings. The width of the strip of fibers passing through the delivery ring determines the percent coverage of the longitudinal windings. For example, if the fibers extend 20 degrees around the delivery ring a 20 degree wide strip is wound onto the mandrel. By winding nine such strips equally spaced apart from each other, 50 percent of the surface of the mandrel can be covered. Therefore, the desired longitudinal angle of wrap and percent coverage can be obtained by adjusting the rotational speed of the mandrel, the speed of the delivery ring, the width of the strips of fibers, and the number of passes made by the delivery ring.

The purpose of the longitudinal windings are to provide longitudinal strength in the pipe in order to accommodate the degree of axial loading that each pipe may be subjected to within the landfill well. Generally, speaking, a fiber reinforced resin material only has strength in the direction that it is wound. Therefore, in specific applications where a high degree of longitudinal strength may be needed, a low longitudinal angle of wrap would be desired. Conversely, a high longitudinal angle of wrap would be desired in an application where only a small degree of longitudinal strength is needed.

The degree of longitudinal strength provided by the longitudinal windings may also depend on the combination of the longitudinal angle of wrap and the percent coverage that is selected. For example, a low longitudinal angle of wrap will result in greater longitudinal strength for a constant percent of coverage. A greater percent of coverage will also result in greater longitudinal strength for a constant longitudinal wrap angle. Accordingly, the desired degree of longitudinal strength may be achieved by selecting the correct combination of longitudinal angle of wrap and percent coverage.

However, the selected wrap angle and percent coverage must also provide the desired size and quantity of openings 36 in the in-process pipe. In a preferred embodiment, a longitudinal wrap angle of approximately 15 degrees from the axis of the pipe and a coverage of approximately 50 percent for each longitudinal winding has been determined to provide both the desired degree of longitudinal strength and the desired number and size of openings in an in-process pipe. It is to be understood that the particular combination of wrap angle and percent coverage selected for the longitudinal windings will vary and may ultimately depend on the particular conditions of the landfill well. For example, the degree of longitudinal strength is dependent on the axial load exerted on a pipe within a landfill well, which may depend on the particular manner in which the well was constructed, i.e., whether the pipe string was suspended within the bore hole, and thus whether each pipe section was subjected to a tension force, or whether the pipe string was grounded on the bottom of the bore hole, and thus whether each pipe section was subjected to a compression force.

The formation of the right and left hand longitudinal windings according to principles of this invention produces a number of equally sized and shaped openings 36 in the pipe surface. The size and shape of these openings depends on the particular width of the fiber-resin strip, the percent coverage, and the longitudinal angle of wrap. Generally speaking, the geometric shape of each opening may comprise a square, rectangle, or diamond configuration, depending on the particular width, percent coverage, and angle of wrap selected. However, the particular size and shape of the openings not only reflects the structural accommodations that are needed to offset down-hole forces, but should also reflect other concerns as well, such as the size of gravel rock that will be used to surround the pipe. Although the size and shape of the openings is initially determined by the width, angle of wrap, and percent coverage of the left and right hand windings, the size and shape of the perforations in the surface of the completed pipe, as will be discussed in more detail below, is ultimately determined by circumferential windings and helical windings that are applied to the surface of the longitudinal windings. Generally speaking, the perforations in the completed pipe should be sized small enough to prevent the passage of the gravel used to surround the pipe.

Although not specifically illustrated, a pipe may be constructed having only a single series of longitudinal windings instead of two directionally opposed longitudinal windings. For example, a pipe may be constructed having a single series of longitudinal windings comprising strips of a fiber reinforced resin material. The longitudinal angle of wrap for each strip may be in the range of from about 5 to 55 degrees from the axis of the pipe. Like the preferred embodiment, the percent coverage of the single series of longitudinal windings may be approximately 50 percent.

As shown in FIG. 2, the pipe 30 comprises a circumferential winding on the surface of the right and left hand windings. The circumferential winding may comprise a fiber reinforced resin material such as epoxy impregnated fiberglass or the like. The circumferential winding comprises a fiber-resin strip that is wound around the circumference of the right and left hand windings to form a plurality of reinforcing ribs 38. Each reinforcing rib comprises a thickness of fiber-resin strip that has been wound around the circumference of the pipe surface at periodic locations along the pipe length.

The reinforcing ribs 38 serve to provide radial stiffness and crush resistance to the pipe and, thus protect the pipe from breaking, deforming or collapsing due to down-hole crushing forces and lateral forces imposed by shifting waste material. In an exemplary embodiment, the ribs are sized and distributed so that they cover approximately 25 percent of the pipe surface comprising the right and left hand windings and the openings between the windings. Distributing the ribs at periodic locations throughout the length of the pipe, to achieve 25 percent coverage, provides a sufficient degree of radial stiffness without the need for constructing a pipe having a continuous wall of significant dimension.

The location of each reinforcing rib 38 along the length of the pipe may depend on the particular diameter of pipe and the amount of down-hole forces that are expected to be exerted on the pipe in the landfill well. Therefore, pipes that are manufactured for use in a landfill well known to have a high degree of lateral shifting or high crusing loads have ribs placed at shorter intervals along the pipe length than pipes that are manufactured for use in a well having only a small amount of down-hole forces. Generally speaking, each rib may be placed apart at intervals in the range of from about one-half to two times the inside diameter of the pipe, as measured from the center of each rib. As shown in FIG. 2, in a preferred embodiment, a pipe having a six inch inside diameter may have ribs placed at 12 inch intervals as measured from the center of each rib. It is also desirable that a rib be located at each end defining the pipe length in order to provide a reinforced portion having increased radial stiffness for purposes of accommodating interconnection between other pipes. The ribs that are formed at each pipe end are referred to as the end ribs 40.

The width of each rib may also depend on the particular diameter of the pipe and the expected down-hole forces that the pipe will be subjected to. For example, a pipe having a six inch inside diameter may comprise reinforcing ribs having a width in the range of from about one to three inches, depending on the expected extent of the down-hole forces. In a preferred embodiment, a pipe constructed according to principles of this invention having a six inch inside diameter may comprise ribs having a width of approximately three inches.

Since radial stiffness is proportional to the cube of wall thickness, an important rib dimension is the radial thickness. Since the particular thickness of each rib is proportional to the desired radial stiffness, the rib thickness will vary depending on the degree of down-hole forces that will be exerted on the pipe. However, as a general rule of thumb, the wall thickness of the completed pipe at a location comprising a reinforcing rib and the longitudinal windings, may be approximately three times the average wall thickness of a pipe, comprising longitudinal windings. Accordingly, the reinforcing rib may have a thickness of approximately twice the average wall thickness of the longitudinal windings. For example, a pipe constructed according to principles of this invention having a six inch inside diameter may have an average wall thickness, comprising the right and left hand windings, of approximately one-eighth of an inch. Accordingly, each three-inch wide reinforcing rib may have a thickness of approximately twice the average wall thickness, or one-quarter of an inch. The total wall thickness of the pipe at a reinforcing rib would be approximately three times the average wall thickness of the longitudinal windings, or three-eighths of an inch.

Such a pipe has a resistance to crushing equivalent to a pipe made out of the same material with a uniform wall thickness of about one-forth of an inch. In such an embodiment about nine inches of the pipe is one-half the thickness of a comparable pipe of uniform thickness. About three inches of the pipe has a thickness 150 percent greater than uniform wall. Thus, a comparable crush resistance is achieved with 25 percent less material, an appreciable cost savings.

The use of reinforcing ribs to provide the desired degree of radial stiffness, and the use of longitudinal windings to provide the desired degree of longitudinal strength avoids the need to construct a pipe having a continuous wall thickness of significant dimension in order to survive the down-hole forces and temperatures encountered in landfill well. For example, a polyethylene pipe having a eight inch inside diameter requires a continuous wall thickness of up to two inches order to provide a sufficient amount of longitudinal and radial strength to survive down-hole conditions. By comparison, a pipe constructed according to principles of this invention having an eight inch inside diameter may have a longitudinal winding thickness of approximately one-eighth of an inch and a total wall thickness, comprising the longitudinal windings and a reinforcing rib, of approximately three-eighths of an inch, significantly less than two inches. The material savings also translates into a weight savings which facilitates the handling and installation of the pipe during the construction of the landfill well.

A reason a pip made from polyethylene must have a greater wall thickness than a pipe made from a fiber reinforced resin material is that polyethylene has a flexural modulus of approximately 200,000 compared to a flexural modulus of approximately 5,000,000 for fiber reinforced resin. Since polyethylene as a material has a relatively low flexural modulus, the pipe wall must be structured and sized accordingly to accommodate the down-hole forces. Since the flexural modulus for fiber reinforced resin is much greater than that for polyethylene, a pipe having a much smaller wall dimension may be constructed. Additionally, the flexural modulus for polyethylene decreases as a function of temperature. Therefore, a pipe constructed from polyethylene must also be structured and sized to accommodate the down-hole temperatures. The combination of the low flexural modulus of polyethylene and the decrease of flexural modulus as a function of temperature necessarily requires that a pipe that is made from polyethylene have a wall thickness of significant dimension.

A helical winding 42 extends across the surface of the right and left hand windings between adjacent reinforcing ribs 38. The helical winding comprises a fiber reinforced resin material such as epoxy impregnated fiberglass or the like configured in the shape of fiber-resin strips. The ribs and the helical winding may be formed from a continuous fiber-resin strip by simply continuing to wind the fiber reinforced resin material along a portion of the length of the pipe after forming a rib of the desired thickness and width. In forming the helical winding, instead of winding the fiber-resin strip about a fixed location on the pipe surface, the fiber-resin strip is wound in a helical fashion across the length of the pipe until a point is reached where a rib is to be formed. At that point, the fiber-resin strip is again wound circumferentially around a fixed location on the pipe surface until a reinforcing rib 38 of desired width and thickness is formed.

As shown in FIG. 2, the helical winding 42 may be formed by winding the fiber-resin strip in a right hand helical pattern. The helical winding 42 serves to provide radial stiffness and enhance the degree of longitudinal strength to the portion of the pipe that resides between the ribs 38. Like the ribs, but to a somewhat lesser extent, the degree of radial stiffness provided by the helical winding is proportional to the cube of the thickness of the pipe wall. Accordingly, the thickness of the helical winding in a preferred embodiment will depend on the extent of the down-hole forces that the pipe will be exposed to in a particular landfill well. Generally speaking, however, the helical winding generally is not as thick as the reinforcing ribs 38.

In order to provide a desired degree of radial stiffness and crush resistance the helical winding may be wound having an helical angle of wrap in the range of from about 55 to 85 degrees from the axis of the pipe. Since the degree of radial stiffness is proportional to the cube of the wall thickness, the amount of radial stiffness will necessarily decrease as the helical angle of wrap departs from 90 degrees, i.e., the circumferential angle of wrap used to construct the ribs 38. Accordingly, a larger helical wrap angle should be used where greater radial stiffness between the ribs is desired. As the helical angle of wrap departs from 90 degrees the contribution to radial stiffness drops off while, at the same time, the contribution to longitudinal strength increases. Therefore, a low helical angle of wrap may be used where it is desired to increase the longitudinal strength along the portion of surface of the series of longitudinal windings between the ribs. Additionally, in a preferred embodiment the helical winding 42 is be formed so that it covers approximately two-thirds of the pipe surface, comprising both the perforations and the longitudinal windings that exist between adjacent reinforcing ribs. The helical winding can also be employed to deliberately cover parts of the holes and thereby limit the total size of the holes to prevent gravel from entering the pipe.

The helical angle of wrap and the width and percent coverage of the helical winding impacts the size, shape, and number of perforations 44 in the surface of the completed pipe. For example, a pipe constructed with a helical winding made from wide fiber-resin strips having a low helical angle of wrap would comprise fewer perforations having larger openings than that of a pipe constructed with a helical winding made from thin fiber-resin windings having a large angle of wrap. Accordingly, the width and angle of wrap that is selected for the helical winding reflects considerations of not only the degree of radial stiffness or longitudinal strength desired, but the desired shape, size and number of perforations 44 in the pipe.

The perforations formed according to principles of this invention may not have a single uniform repeating shape. Rather, the perforations formed by applying the helical winding 42 represents a multitude of conventional and unconventional geometric configurations obtained by partitioning the rectangular, square, or diamond shaped openings 36, formed by the right and left hand longitudinal windings, at helical angles of wrap in the range of from about 55 to 85 degrees from the axis of the pipe.

The desired size of the perforations may reflect the type of materials used to construct the well, i.e., the size of the gravel rock that will be used to surround the pipe. In a preferred embodiment, the size of the perforations 44 may be one-quarter or one-half inch in order to prevent three-quarter inch gravel rock from passing through the pipe.

The embodiment of the pipe constructed as described and illustrated is referred to as a "double angle" pipe due to its configuration of longitudinal windings and helical windings having different angles of wrap, i.e., the longitudinal windings having an angle of wrap in the range of from 5 to 55 degrees and the helical winding having an angle of wrap in the range of from 55 to 85 degrees. However, if desired as an alternative embodiment the helical winding may be wound around the surface of the series of longitudinal windings at a helical angle wrap in the range of from 5 to 55 degrees, similar to the range of the longitudinal angle of wrap. This low range of angle of wrap may be used when the primary purpose of the helical winding is to increase the longitudinal strength of the pipe between the reinforcing ribs. If desired, the helical winding may also be wound at the same angle of wrap, and in the same direction, as that used for a series of underlying longitudinal windings, producing what is referred to as a "single angle" pipe. The helical winding is wound at the same angle and laid over a longitudinal winding to avoid covering any of the holes between the longitudinal windings. Such a single angle pipe comprises perforations having only a single square, rectangular, or diamond shaped configuration.

As shown in FIGS. 2 and 3, a section of pipe constructed in the manner described and illustrated may comprise right hand longitudinal windings 32 and left hand longitudinal windings 34, a series of reinforcing ribs 38, a helical winding 42 connecting the ribs together, and a plurality of perforations 44. In a preferred embodiment, the completed pipe may comprise fiber reinforced resin material that is distributed such that approximately two-thirds of the material comprises reinforcing ribs, end ribs, and helical winding, and the remaining one-third of the material comprises longitudinal windings. These windings a substantial savings in material used to fabricate the pipe.

In order to minimize the amount of down-hole lateral forces that are exerted upon each pipe section within a landfill well, it is desirable to connect the pipe sections together in a manner that allows each pipe section a predetermined degree of independent lateral movement. An articulating coupling 46 is used to connect each pipe and accommodate such independent lateral movement.

As shown in FIG. 4, the articulating coupling comprises a hollow cylindrical sleeve 46 that can be made from a fiber reinforced resin such as epoxy impregnated fiberglass or the like. The coupling has an inside diameter that is slightly larger then the outside diameter of the end rib 40 in order to permit the passage of the coupling over each pipe end in the manner illustrated in FIG. 4. The coupling has a length sufficient to accommodate its placement over the end portions of two adjacent pipes. The coupling has a sufficient wall thickness to withstand the longitudinal and radial stresses that may be exerted upon the coupling by the interconnecting pipes, both during the assembly of the pipe string and down-hole by the shifting waste material. In a typical embodiment, a coupling used for interconnecting a pipe having a six inch inside diameter may have an inside diameter of approximately 6.7 inches, a length of approximately four inches, and a wall thickness of approximately one-half of an inch.

Each pipe may be retained within the coupling by a key 50 that is interposed between a rib groove 52, extending circumferentially around the outside surface of each end rib 40, and a coupling groove 54, extending circumferentially around the inside surface of the coupling 46. In order to accommodate the interconnection between two pipes, the coupling necessarily comprises two coupling grooves 54, each groove being positioned near a coupling opening 56. The key comprises a length of resilient material such as nylon or the like and have a cross section of sufficient size and configuration to fill the space created by the alignment of the rib groove 52 and a respective coupling groove 54 when an end of a pipe is inserted into a coupling opening.

Each key 50 may be inserted into the space defined by the alignment of the rib groove and the coupling groove though a key opening 58 located in the surface of the coupling. Each key opening 58 comprises a hole that is tangent to each coupling groove 54 and extends from the outside surface of the coupling, through the coupling wall and into the coupling groove. In a preferred embodiment, a coupling 46 used to join together two pipes, each having a six inch inside diameter, may use two nylon keys, one for each pipe, each having a diameter of approximately one-quarter of an inch.

Each rib groove and coupling groove should be configured having a sufficient groove width to permit each interconnecting pipe a predetermined degree of articulating movement within the coupling, as afforded by interaction of the key within the grooves. The grooves may, for example, each be about one-half of an inch wide. With a quarter of an inch diameter key in place, axial shifting of up to about three-quarters of an inch may occur. In order to accommodate angular articulating movement of each interconnecting pipe within the coupling, the inside surface near each coupling opening 56 is flared outwardly a slight amount. As shown in FIG. 4, the inside surface of the coupling, residing between each coupling opening 56 and the respective coupling groove 54 is flared outward and away from the axis of the coupling, as viewed from the center of the coupling. In a preferred embodiment, a coupling used to join together two pipes, each having a six inch inside diameter, may comprise coupling openings having a flare angle of approximately ten degrees as measured from the axis of the coupling.

In order to accommodate the articulating movement of each interconnected pipe within the coupling, portions of outside circumference of the end rib 40 on each side of the rib groove 52 are either rounded or contoured. As shown in FIG. 4, the portion of the end rib 40 that resides between the pipe opening and the beginning of the rib groove 52 has a slightly rounded configuration. Rounding each end rib in this manner provides a spherical surface at each pipe end serving to increase the amount of articulating movement of each pipe within the coupling by reducing the degree of interference between the end rib and the inside wall of the coupling. In a preferred embodiment, a pipe having a six inch inside diameter may comprise a end rib with a rounded portion having a spherical radius of approximately 3.32 inches, as measured from the axis of the pipe at the center of the rib groove.

In order to further increase the amount of articulating movement within the coupling, a portion of the outside circumference of each end rib, residing near the side of the rib groove opposite the pipe opening, is contoured inwardly a slight amount. This portion of the end rib is contoured in order to accommodate complementary interaction with the flared inside wall of the coupling opening 56. Shaping the end rib in this manner serves to increase the amount of articulating movement of each interconnecting pipe within the coupling by reducing the degree of interference between the end rib 40 and the flared inside wall of the coupling opening 56.

The combination of the flared inside wall of the coupling openings 56 and the rounded and contoured end ribs 40, together with the interacting rib groove 52 and coupling groove 54, permits each pipe joined together by a coupling to articulate approximately four degrees, as measured from the axis of the coupling. As shown in FIG. 1, the lateral forces caused by shifting waste material may cause a pipe string 12, comprising pipe sections joined together according to principles of this invention, to shift in position from the original bore hole over a period of time. The articulating coupling permits each interconnecting pipe section to move independently within the pipe string in response to the particular down-hole lateral forces that may be exerted upon each individual pipe section. This serves to reduce the probability of pipe failure due to down-hole forces.

Although specific embodiments of the pipe and coupling have been described herein, many modifications and variations will be apparent to those skilled in the art. For example, instead of constructing a pipe section having an entire length comprising perforations, a pipe section may be constructed according to principles of this invention having a portion of its length perforated and a remaining portion of its length nonperforated. A specific embodiment of such construction may comprise a pipe having a perforated surface extending from one end to the middle of its length and a nonperforated surface from the middle of its length to opposite end. The nonperforated surface may by achieved by changing the percent coverage of the right and left hand longitudinal windings at the middle of the pipe length from 50 percent to 100 percent. This alternative embodiment of the pipe may be used to replace the nonperforated pipe that occupies the first position in the pipe string. As pointed out above, a savings of material of 25 percent can be achieved as compared with a pipe of uniform wall thickness having the same crush resistance.

Additionally, an alternative embodiment of the coupling 46 may comprise a second set of grooves (not shown) and O-rings (not shown) residing within the grooves. Each groove may extend circumferentially around the inside surface of coupling at a location between the existing coupling grooves 54. Each O-ring may be of sufficient size and shape to reside within a respective groove and protrude a predetermined distance from the inside surface of the coupling and contact the outside surface of the pipe. This alternative embodiment of the coupling would effect an air-tight seal between the inside surface of the coupling and the outside surface of each pipe interconnecting pipe end. An air tight seal between the interconnecting pipes in a pipe string may be desirable in order to minimize vacuum losses between interconnecting pipe sections in an upper portion of a well. Minimizing such vacuum losses would effectively increase the efficiency of the gas extraction operation by maximizing the amount of vacuum that is actually directed toward extracting the landfill gases. Leakage of air into the pipe, which would decrease the heating value of the extracted gases, would be inhibited. For example, such sealed articulating couplings may be used to join together the nonperforated pipe sections in the pipe string in order to preserve and direct the vacuum being pulled on the pipe string to the perforated pipe sections.

It is preferred that the pipes be assembled with rings at each end and a separate coupling. It will be apparent that a somewhat similar result can be achieved with a bell and spigot connection between adjacent pipes. A coupling is preferred since it gives twice the angular articulation between pipes and twice the longitudinal movement as compared with the single connection of a bell and spigot. Thus, in effect, a "connector" may be integral with one of the pipes.

Accordingly, it is to be understood that, within the scope of the appended claims, the present invention may be embodied other than that specifically described herein.

What is claimed is:

1. A pipe used for extracting gases from a landfill well, the pipe comprising:
   at least one series of longitudinal windings of a fiber reinforced resin extending in a helical pattern forming a hollow cylinder; and
   a number of periodically spaced apart reinforcing ribs of fiber reinforced resin extending circumferentially around the outside surface of the longitudinal windings, wherein the reinforcing ribs are independent from one another, and wherein each rib has a thickness greater than a wall portion of the pipe formed from the series of longitudinal windings.

2. A pipe used for extracting gases from a landfill well, the pipe comprising:
   at least one Series of longitudinal windings of a fiber reinforced resin extending in a helical pattern forming a hollow cylinder;

a number of periodically spaced apart reinforcing ribs of fiber reinforced resin extending circumferentially around the outside surface of the longitudinal winding; and a helical winding extending in a helical pattern around the surface of the longitudinal windings between adjacent reinforcing ribs for providing radial stiffness and longitudinal strength to the section of pipe between adjacent reinforcing ribs.

3. The pipe as recited in claim 2 wherein the longitudinal winding have a longitudinal angle of wrap less than 55 degrees from the axis of the pipe.

4. The pipe as recited in claim 2 wherein the longitudinal windings between adjacent reinforcing ribs are spaced apart for forming a plurality of perforations.

5. The pipe as recited in claim 1 wherein the pipe comprises right hand longitudinal windings and left hand longitudinal windings, the left hand longitudinal windings extending in a helical pattern having a direction opposite to and intersecting with the right hand longitudinal windings forming an interlocking network of longitudinal windings for providing longitudinal strength.

6. The pipe as recited in claim 5 wherein the series of longitudinal windings are spaced apart from each other for covering the surface of the pipe with approximately 75 percent windings and 25 percent opening.

7. The pipe as recited in claim 1 wherein a reinforcing rib is positioned at each end of the pipe for providing a reinforced section for accommodating interconnection between adjacent pipes.

8. A pipe used for extracting gases from a landfill well, the pipe comprising:

at least one series of longitudinal windings of a fiber reinforced resin extending in a helical pattern forming a hollow cylinder; and a number of periodically spaced apart reinforcing ribs of fiber reinforced resin extending circumferentially around the outside surface of the longitudinal windings, wherein a reinforcing rib is positioned at each end of the pipe for providing a reinforced section for accommodating interconnection between adjacent pipes, and wherein each end of the pipe comprises a groove extending circumferentially around the outside surface of the reinforcing rib.

9. The pipe as recited in claim 8 wherein the reinforcing ribs cover approximately 25 percent of the series of longitudinal windings.

10. The pipe for extracting gases from a landfill well, the pipe comprising:

a series of right hand longitudinal windings of fiber reinforced resin wound longitudinally in a helical pattern for providing longitudinal strength;

a series of left hand longitudinal windings of fiber reinforced resin wound longitudinally in a helical pattern for providing longitudinal strength, the left hand windings being wound in a direction opposite to and intersecting with the right hand windings;

a number of reinforcing ribs of fiber reinforced resin extending circumferentially around the surface of the right and left hand series of longitudinal windings for providing radial stiffness;

a helical winding of fiber reinforced resin wound in a helical fashion onto the surface of the right and left hand winding between adjacent reinforcing ribs for providing radial stiffness and longitudinal strength; and a plurality of perforations located between adjacent reinforcing ribs through the surface of the right and left hand windings.

11. The pipe as recited in claim 10 wherein the right and left hand longitudinal windings form an interlocking network of longitudinal windings spaced apart to form an outside pipe surface comprising approximately 75 percent windings and 25 percent openings.

12. The pipe as recited in claim 11 wherein the right and left hand longitudinal windings are wound at a longitudinal angle of wrap in the range of from about 5 to 55 degrees from the axis of the pipe.

13. The pipe as recited in claim 10 wherein the reinforcing ribs are located at equidistant locations along the surface of the right and left hand longitudinal windings and at a first and second end of the pipe to provide radial stiffness for interconnection between adjacent pipes.

14. The pipe as recited in claim 10 wherein the reinforcing ribs are spaced apart from each other a distance in the range of from about one-half to two times an inside diameter of the pipe.

15. The pipe as recited in claim 14 wherein the total wall thickness of the pipe comprising a reinforcing rib and the longitudinal windings is approximately three times the average wall thickness of the right and left hand longitudinal windings.

16. The pipe as recited in claim 10 wherein the reinforcing ribs cover approximately 25 percent of the surface of the right and left hand longitudinal windings.

17. The pipe as recited in claim 10 wherein the helical winding is wound at a helical angle of wrap in the range of from about 55 to 85 degrees from the axis of the pipe.

18. The pipe for extracting gases from a landfill well comprising a number of pipes as recited in claim 10 connected together end to end.

19. The pipe as recited in claim 18 comprising a coupling for joining together the pipes in a manner accommodating the articulating movement of each pipe within the coupling, the coupling comprising:

a hollow cylindrical sleeve;

a groove extending circumferentially around the inside surface of an open end of the coupling; and a key for occupying at least a portion of a space formed by inserting a pipe end into the open end and aligning a groove in the pipe end with a groove in the open end of the coupling, the key serving to retain the pipe end within the coupling.

20. A pipe used for extracting gases from landfill wells, the pipe comprising:

a series of right hand longitudinal windings of fiber reinforced resin wound longitudinally in a helical pattern having a longitudinal angle of wrap in the range of from about 5 to 55 degrees from the axis of the pipe;

a series of left hand longitudinal windings of fiber reinforced resin wound longitudinally in a helical pattern having a longitudinal angle of wrap in the range of from about 5 to 55 degrees from the axis of the pipe, the left hand windings being wound in a direction opposite to and intersecting with the right hand windings;

a number of reinforcing ribs of fiber reinforced resin extending circumferentially around the surface of the right and left hand windings, the reinforcing ribs being placed at equidistant locations along the outside surface of the right and left hand windings;

a helical winding of fibre reinforced resin wound around the outside surface of the right and left hand windings between adjacent reinforcing ribs, the helical winding being wound in a helical pattern having a helical angle of wrap in the range of from about 55 to 85 degrees from the axis of the pipe; and a plurality of perforations through the surface of the right and left hand windings located between adjacent reinforcing ribs and the helical winding.

21. The pipe as recited in claim 20 wherein the right and left hand longitudinal windings form an interlocking network of spaced apart intersecting longitudinal windings spaced apart to form an outside pipe surface comprising approximately 75 percent windings and 25 percent openings.

22. A pipe as recited in claim 21 wherein the reinforcing ribs are placed apart from each other a distance in the range of from about one-half to two times an inside diameter of the pipe.

23. A pipe as recited in claim 22 wherein the reinforcing ribs cover approximately 25 percent of the outside surface of the right and left hand longitudinal windings.

24. A pipe as recited in claim 23 wherein the helical winding covers approximately two-thirds of the outside surface of the right and left hand longitudinal windings.

25. A pipe system for extracting gases from a landfill well, the pipe system comprising:

a number of pipes, each pipe comprising;

a series of right hand longitudinal windings of fiber reinforced resin wound longitudinally in a right hand helical pattern for providing longitudinal strength;

a series of left hand longitudinal windings of fiber reinforced resin wound longitudinally in a left hand helical pattern opposite to and intersecting with the right hand windings, the right and left hand windings forming a hollow cylinder having an interlocking configuration of windings;

a number of reinforcing ribs of fiber reinforced rein each extending circumferentially around the outside surface of the right and left hand windings at regular intervals and at each end of the pipe;

a groove extending circumferentially around an outside surface of each rib positioned at the ends of the pipe;

a helical winding of fiber reinforced resin wound in a helical pattern about the outside surface of the right and left hand windings between and connecting with adjacent reinforcing ribs; and a plurality of perforations in the surface of the right and left hand windings between adjacent reinforcing ribs and the helical winding;

a number of couplings for joining together adjacent pipes in a manner permitting the articulating movement of each pipe within the coupling, each coupling comprising;

a hollow cylindrical sleeve of sufficient length and diameter to accommodate the ends of two adjacent pipes, the sleeve having a first opening and a second opening opposite to the first opening; and a groove extending circumferentially along an inside surface of the first and second opening.

26. The pipe system as recited in claim 25 wherein the coupling comprises a key made from a length of material of sufficient size and shape to occupy a portion of a space created by inserting the end of a pipe into the coupling and aligning the groove in the pipe with a groove in a respective coupling opening, the key serving to retain the pipe within the coupling.

27. The pipe system as recited in claim 26 wherein the reinforcing rib located at each end of the pipe is rounded between an opening of the pipe and the groove, the rounded portion serving to increase the angle of movement between the end of the pipe and an inside wall of the coupling.

28. The pipe system as recited in claim 27 wherein the reinforcing rib located at each end of the pipe comprises a contoured portion on the side of the groove opposite to an opening of the pipe, the contoured portion serving to increase the degree of movement between the pipe end and an inside wall of a respective coupling opening.

29. The pipe system as recited in claim 28 wherein each opening of the coupling is flared in an outward fashion to increase the angle of movement between the end of the pipe and an inside surface of the respective coupling opening.

* * * * *